(12) United States Patent
Wei

(10) Patent No.: US 11,767,903 B2
(45) Date of Patent: Sep. 26, 2023

(54) ACTUATOR MODULE FOR A DRIVELINE ASSEMBLY

(71) Applicant: Stoneridge Control Devices, Inc., Novi, MI (US)

(72) Inventor: Xiao Jun Wei, Canton, MI (US)

(73) Assignee: STONERIDGE CONTROL DEVICES, INC., Novi, MI (US)

(*) Notice: Subject to any disclaimer, the term of this patent is extended or adjusted under 35 U.S.C. 154(b) by 54 days.

(21) Appl. No.: 17/144,408

(22) Filed: Jan. 8, 2021

(65) Prior Publication Data
US 2021/0215237 A1 Jul. 15, 2021

Related U.S. Application Data

(60) Provisional application No. 62/958,766, filed on Jan. 9, 2020.

(51) Int. Cl.
*F16H 25/20* (2006.01)
*F16H 61/00* (2006.01)
(Continued)

(52) U.S. Cl.
CPC ......... *F16H 25/20* (2013.01); *F16H 61/0006* (2013.01); *F16H 61/32* (2013.01); *F16H 61/0202* (2013.01); *F16H 63/304* (2013.01); *F16H 2025/209* (2013.01); *F16H 2025/2031* (2013.01); *F16H 2025/2084* (2013.01);
(Continued)

(58) Field of Classification Search
CPC ..... F16H 2025/2031; F16H 2061/2884; F16H 2061/2892; F16H 2061/326; F16H 2063/3063; F16H 2063/3066; F16H 25/20; F16H 61/0006; F16H 61/32; F16H 61/66259; F16H 63/304; F16H 61/0202;
(Continued)

(56) References Cited

U.S. PATENT DOCUMENTS 4,449,416 A * 5/1984 Huitema ............... F16H 63/304
74/DIG. 7
4,713,654 A * 12/1987 Sweany .................. G01P 13/00
340/671
(Continued)

FOREIGN PATENT DOCUMENTS

EP 1449705 A2 8/2004
KR 101666135 B1 10/2016

OTHER PUBLICATIONS

International Preliminary Report on Patentability for International Application No. PCT/US2021/012613 dated Jul. 21, 2022.

*Primary Examiner* — Charles A Fox
*Assistant Examiner* — Gregory T Prather
(74) *Attorney, Agent, or Firm* — Carlson, Gaskey & Olds, P.C.

(57) ABSTRACT

An actuator module for a driveline assembly includes, among other things, a cover housing and a fork driving unit supported by the cover housing. The fork driving unit includes a fork driver and a pusher assembly coupled to the fork driver by spaced apart pusher ends. The fork driving unit also includes a drive assembly carried by the pusher assembly to translate the fork driver relative to the cover housing. The fork driving unit further includes a spring that biases the pusher assembly and fork driver to a neutral position.

17 Claims, 16 Drawing Sheets

(51) Int. Cl.
*F16H 61/28* (2006.01)
*F16H 63/30* (2006.01)
*F16H 61/32* (2006.01)
*F16H 61/02* (2006.01)

(52) U.S. Cl.
CPC .......... *F16H 2061/2884* (2013.01); *F16H 2061/2892* (2013.01); *F16H 2063/3063* (2013.01); *F16H 2063/3066* (2013.01)

(58) Field of Classification Search
CPC ....... F16H 2025/2084; F16H 2025/209; G01P 3/44; G01P 3/487
See application file for complete search history.

(56) References Cited

U.S. PATENT DOCUMENTS

| | | | |
|---|---|---|---|
| 4,811,001 A * | 3/1989 | Sweany | G01P 13/00 340/671 |
| 4,846,010 A | 7/1989 | Fujikawa et al. | |
| 5,689,997 A | 11/1997 | Schaller | |
| 5,725,453 A | 3/1998 | Zalewski et al. | |
| 7,350,432 B2 | 4/2008 | Somschor et al. | |
| 7,793,767 B2 | 9/2010 | Heravi et al. | |
| 7,997,653 B2 | 8/2011 | Szybisty et al. | |
| 8,016,354 B2 | 9/2011 | Veluswamy et al. | |
| 8,082,816 B2 | 12/2011 | Lai et al. | |
| 8,256,822 B2 * | 9/2012 | Koga | B60N 2/067 74/416 |
| 8,485,489 B2 * | 7/2013 | Hofschulte | B60N 2/067 248/424 |
| 8,733,192 B2 | 5/2014 | Wu | |
| 8,746,796 B2 | 6/2014 | Wei | |
| 8,876,213 B2 | 11/2014 | Tame et al. | |
| 9,327,618 B2 | 5/2016 | Villarroel et al. | |
| 9,376,036 B2 | 6/2016 | Wei et al. | |
| 9,428,085 B2 | 8/2016 | Villarroel et al. | |
| 10,106,059 B2 | 10/2018 | Wei et al. | |
| 2013/0186217 A1 | 7/2013 | Enokijima | |
| 2015/0053027 A1 * | 2/2015 | Downs | F16D 13/58 192/94 |
| 2015/0059505 A1 * | 3/2015 | Enokijima | F16H 57/032 74/416 |
| 2018/0031091 A1 | 2/2018 | Wu | |
| 2019/0264753 A1 * | 8/2019 | Creech | B60K 17/35 |

* cited by examiner

ACTUATOR MODULE FOR A DRIVELINE ASSEMBLY

CROSS-REFERENCE TO RELATED APPLICATION

This application claims priority to U.S. Provisional Application No. 62/958,766 filed on Jan. 9, 2020.

BACKGROUND

The disclosure relates to an actuator module such as a vehicle transmission or other vehicle driveline component.

Vehicles include a driveline, which is used to transmit rotational drive from the vehicle's power plant to the wheels. Typical driveline components include, for example, transmissions, transfer cases, front and rear axles, and drive shafts. Many driveline components have a rotatable and/or slidable member that is movable between multiple positions using an actuator during vehicle operation. Examples include transmission and transfer case shift collars and park locks. A common challenge in designing driveline components is providing an actuator system that is compact, durable, efficient and cost-effective.

SUMMARY

In one exemplary embodiment, an actuator module for a driveline assembly includes, among other things, a cover housing and a fork driving unit supported by the cover housing. The fork driving unit includes a fork driver and a pusher assembly coupled to the fork driver by spaced apart pusher ends. The fork driving unit also includes a drive assembly carried by the pusher assembly to translate the fork driver relative to the cover housing. The fork driving unit further includes a spring that biases the pusher assembly and fork driver to a neutral position.

In a further embodiment of any of the above, the actuator module includes a fork shaft that is supported by the cover housing. The fork driver is slidably supported by the fork shaft between multiple shift positions. The drive assembly is arranged parallel to the fork shaft.

In a further embodiment of any of the above, the fork driver includes first and second walls that extend from a central portion. The first and second walls have shaped apertures. The pusher ends are received in the shaped apertures to permit the pusher assembly to axially slide relative to the fork driver between the neutral position and a transition position while preventing rotation of the pusher assembly relative to the fork driver.

In a further embodiment of any of the above, the cover housing assembly includes first and second cover portions that enclose the drive assembly.

In a further embodiment of any of the above, the actuator module includes a motor and a gearbox that is coupled to the motor and the drive assembly. The motor and the gearbox are arranged between the first and second cover portions.

In a further embodiment of any of the above, the pusher assembly includes first and second pushers that are joined by a drive nut with left-hand and right-hand threads. Each of the first and second pushers includes a flange seat that is received in a respective shape aperture. Each of the opposing ends of the spring engages one of the first and second walls and the flange seats and one of the first and second pushers.

In a further embodiment of any of the above, the drive nut has a threaded inner diameter that threadingly engages a threaded shaft of the drive assembly.

In a further embodiment of any of the above, the threaded shaft has first and second ends. The first end is coupled to the worm gear. The second end is supported by a bracket that is secured to the cover assembly.

In a further embodiment of any of the above, the drive assembly has a drive axis and includes a rotary sensor assembly that has a rotary sensor with a sensor axis offset from the drive axis. The rotary sensor is operatively coupled to the drive assembly and configured to measure a position of the fork driver.

In a further embodiment of any of the above, the actuator module includes a linear sensor assembly that is mounted to the fork driver and is configured to measure a position of the fork driver.

In a further embodiment of any of the above, the actuator module includes a gearbox that is coupled to a motor and the drive assembly. The gearbox has a worm and a worm gear that is mounted to first and second gear housing brackets having an L-shape. Each of the first and second gear housing brackets include a mounting flange that is secured to the cover assembly.

In a further embodiment of any of the above, the motor is connected to the worm. The drive assembly is connected to the worm gear.

In another exemplary embodiment, an actuator module for a driveline assembly includes a cover housing, a motor that is supported relative to the cover housing and a fork driving unit that is supported by the cover housing. The fork driving unit includes a fork driver and a drive assembly that is configured to translate the fork driver relative to the cover housing. A gearbox is coupled to the motor and the drive assembly. The gearbox is supported relative to the cover housing.

In a further embodiment of any of the above, the gearbox has a worm and a worm gear that is mounted to first and second gear housing brackets having an L-shape. Each of the first and second gear housing brackets include a mounting flange that is secured to the cover assembly.

In a further embodiment of any of the above, the first and second gear housing brackets include holes that are configured to receive bushings that support cylindrical ends of the worm and the worm gear.

In a further embodiment of any of the above, the drive assembly includes a threaded shaft with first and second ends. The first end is coupled to the worm gear. The second end is supported by a bracket that is secured to the cover assembly. A bracket supports a worm and a bearing that receives the first end.

In another exemplary embodiment, an actuator module for a driveline assembly includes a cover housing, a printed circuit board, a motor that is supported relative to the cover housing and a fork driving unit that is supported by the cover housing. The fork driving unit includes a fork driver. A sensor is in communication with the printed circuit board and is arranged in relation to the fork driving unit to measure a position of the fork driver.

In a further embodiment of any of the above, the actuator module includes a gearbox that is coupled to the motor and a drive assembly that is configured to translate the fork driver relative to the cover housing. A gearbox is supported relative to the cover housing. The drive assembly has a drive axis. The sensor includes a rotary sensor assembly that has a rotary sensor with a sensor axis offset from the drive axis. The rotary sensor is operatively coupled to the drive assembly and is configured to measure the position of the fork driver.

In a further embodiment of any of the above, the drive assembly includes a threaded shaft. The rotary sensor assembly includes a drive pulley that is attached to threaded shaft. An anchor pin is mounted to the cover housing to support a follow pulley to which the rotary sensor is mounted. A belt interconnects the drive and follow pulleys.

In a further embodiment of any of the above, the sensor includes a linear sensor assembly that is mounted to the fork driver and is configured to measure the position of the fork driver.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
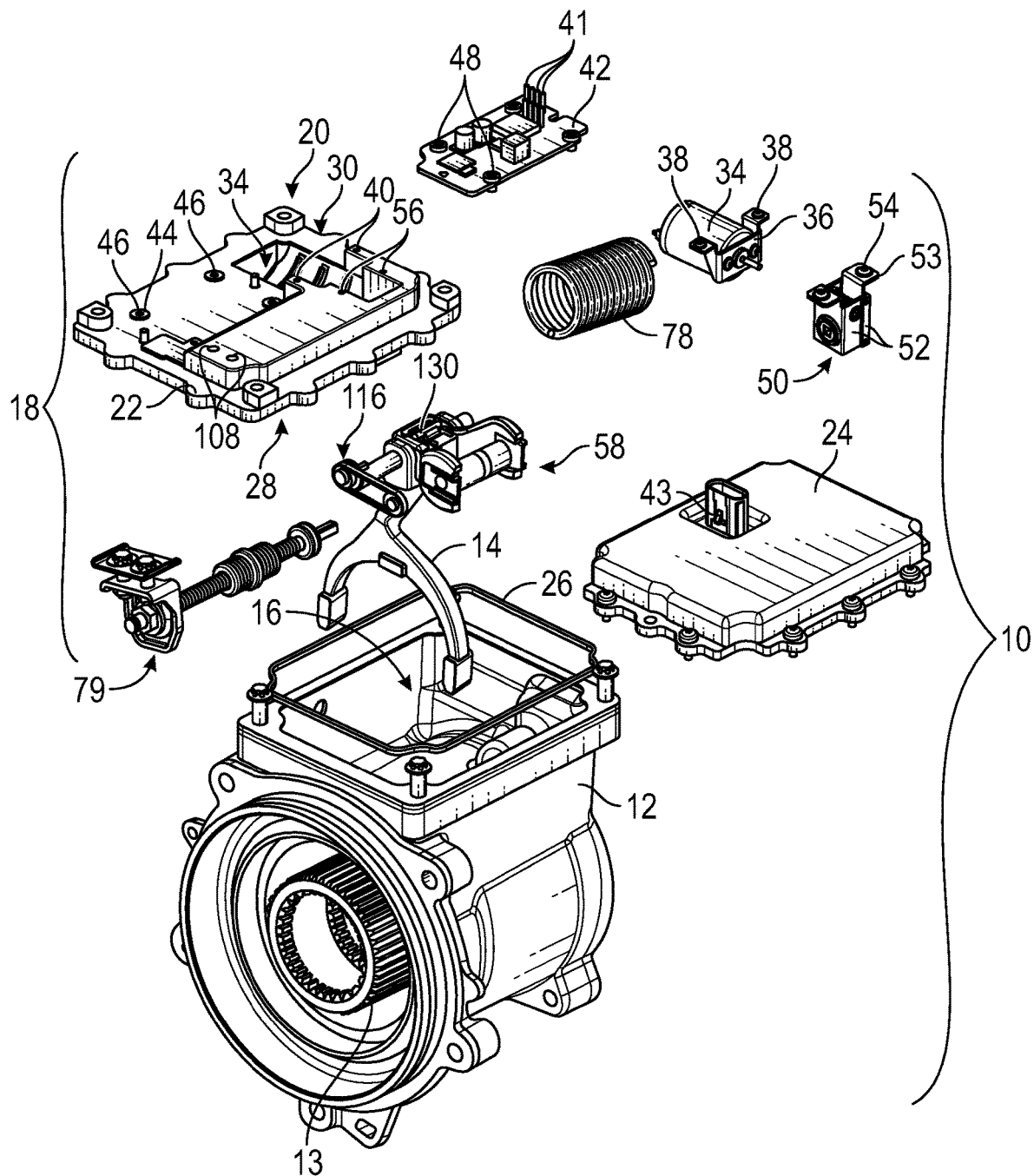
FIG. 1 is an exploded perspective view of a driveline assembly with the disclosed actuator module.

A driveline assembly 10, shown in FIG. 1, includes an actuator module 18 that is used to shift a component within the driveline assembly between multiple positions. In one example, the driveline assembly 10 is a gearbox, but other driveline components are contemplated, such as a transfer box, or a park lock. A shifting member 13, such as a shifting sleeve, is arranged within a housing 12 of the driveline assembly 10. The shifting sleeve includes a collar having an annular groove (not shown), as is known. The actuator module 18 includes a shift fork 14 that cooperates with the shifting member 13 and is received in the collar. Sliding the shift fork 14 axially moves the shifting sleeve between multiple positions corresponding to different transmission gears positions.

The actuator module 18 is housed with respect to a cover housing 20 having first and second cover portions 22, 24 that are secured to one another about a gasket 26. The first cover portion 22 includes a "wet" first side 28 facing a cavity 16 of the housing 12 that is exposed to lubricant and a "dry" second side 30 facing the second cover portion 24 that is sealed from the lubricant. The actuator module 18 contains all the components that are need to provide shifting to driveline component and can be secured to the housing 12 as a single unit.

The second side 30 of the first cover portion 22 includes a pocket 34 that receives an electric motor 34 supported by a mounting bracket 36. The mounting bracket 36 is secured by fasteners 38 to holes 40 in the first cover portion 22. The motor 34 may be a brushed or brushless DC motor.

Bosses 44 are provided on the second side 30 and include holes 46. A printed circuit board (PCB) 42 is secured to the bosses 44 by fasteners 48. Terminals 41 from the PCB 42 extend to a connector 43 that is carried by the second cover portion 24 when the actuator module 18 is fully assembled. The connector 43 receives command signals from the vehicle that control the shifting of the driveline assembly.

A gearbox 50 couples the motor 34 to a drive assembly 79, which translates the shift fork 14. The motor 34 is arranged between the first and second cover portions 22, 24 in the dry side, and the gearbox 50 and drive assembly 79 are mounted to the first cover portion 22. In one example, the gearbox 50 includes first and second gear housing brackets 52 that have an L-shape. The brackets 52 each include mounting flanges 53 that are secured by fasteners 54 to holes 56 in the first cover portion 22. In this manner, a customized gearbox 50 may be easily swapped in and out of the actuator module 18 for a given driveline assembly application, enabling customized gear ratios for the specific application.

Figure 2A:
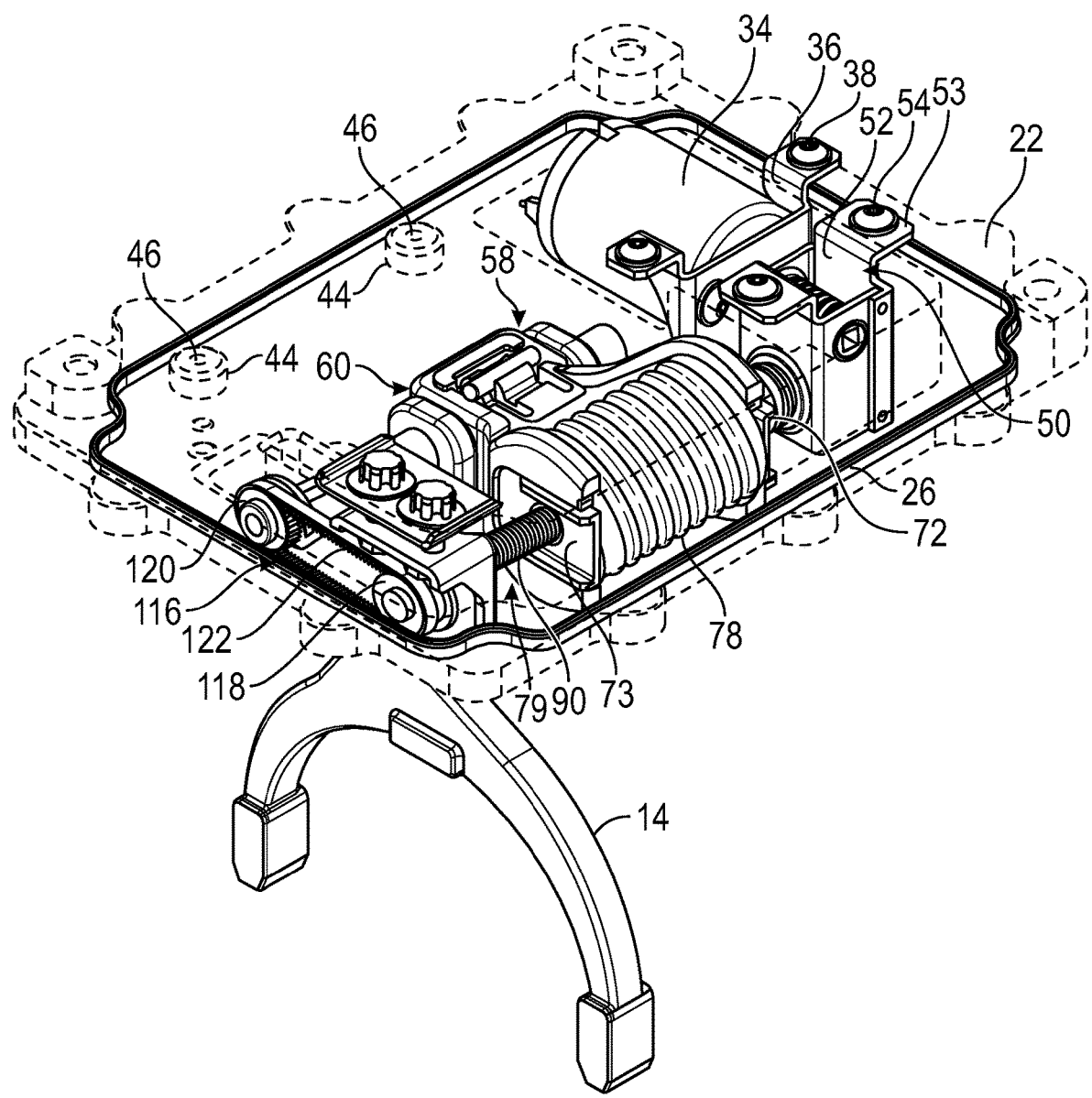
FIGS. 2A and 2B are perspective and top views of the actuator module shown in FIG. 1 without an outer cover and with an inner cover shown in phantom.
Figure 2B:
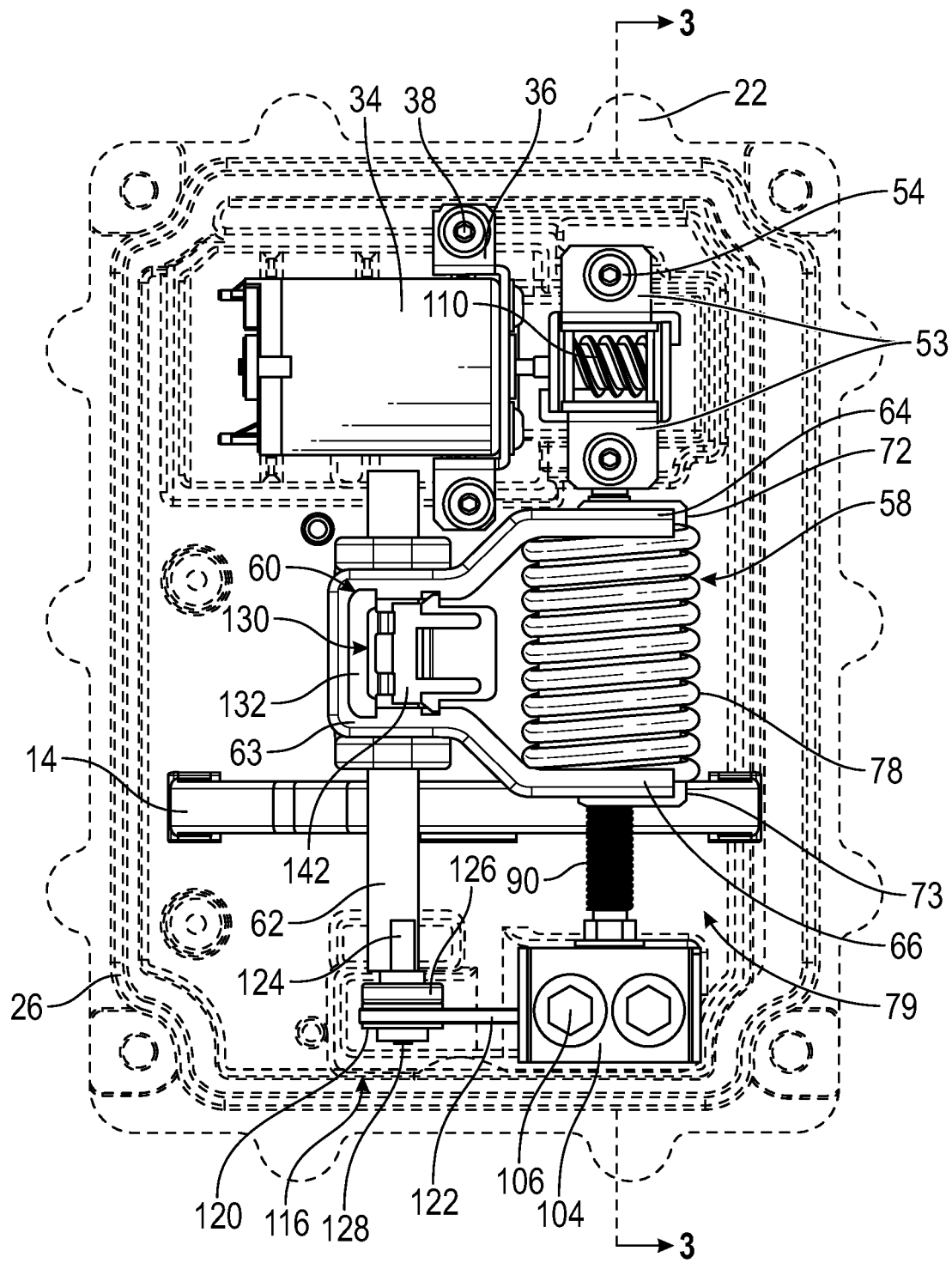
Figure 3:
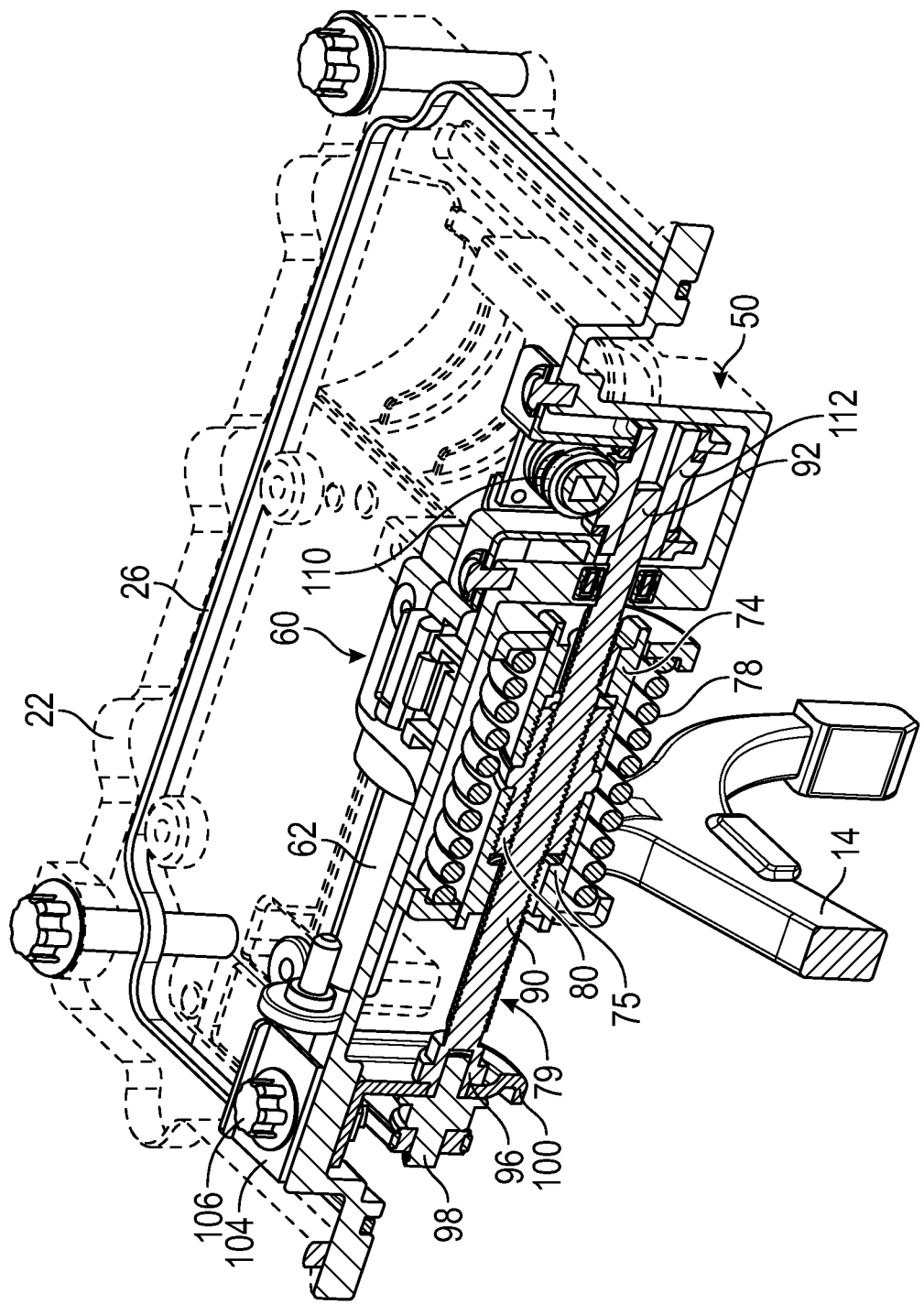
FIG. 3 is a cross-sectional view of the actuator module shown in FIGS. 2A and 2B taken along line 3-3 in FIG. 2B.

A fork driving unit 58 cooperates with the drive assembly 79. Referring to FIGS. 2A-3, the fork driving unit 58 includes a fork driver 60 that is mounted to a fork shaft 62, which has its opposing ends supported in bosses provided by the first side 28 of the first cover portion 22. The fork shaft 62 may be fixed against rotation as it need not rotate during operation. In the example shown, the fork driver 60 includes a central portion 63 that supports first and second walls 64, 66 that are spaced apart from one another to form a C-shaped configuration. The fork 14 is disposed within the central portion 63. Bores 68 are provided in the central portion 63 and in the fork 14 to slidably support the fork driving unit 58 on the fork shaft 62, which is parallel to the drive assembly 79.

Figure 4:
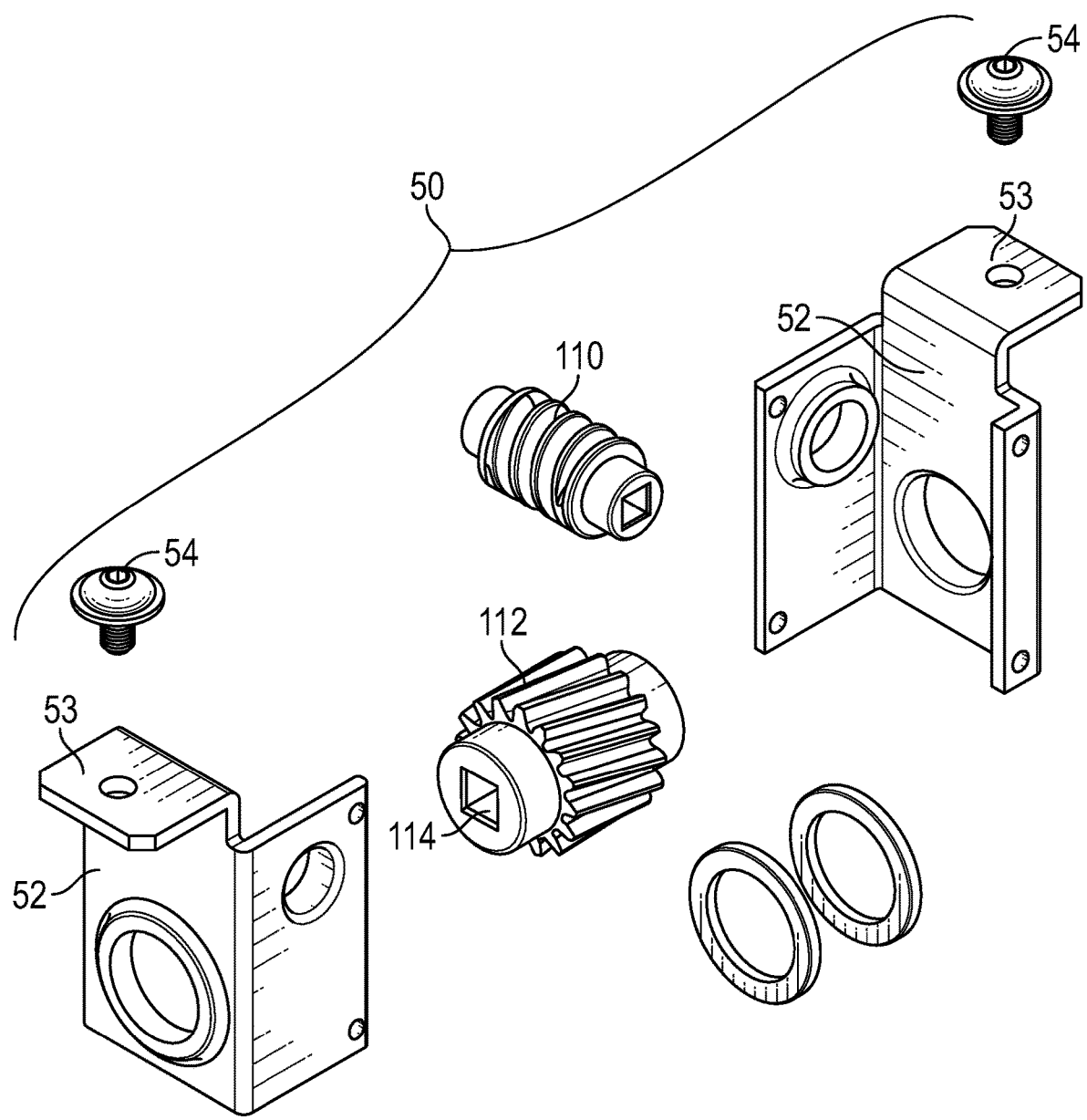
FIG. 4 is an exploded view of a gearbox of the actuator module.

Referring to FIG. 4, the gearbox 50 uses interchangeable brackets 52 for simplicity. The brackets 52 can be located with respect to one another by complementary dimples and depressions or secured using fasteners. The brackets 52 support a worm 110 coupled to a worm gear 112. Worm gear 112 includes an opening 114 having a complementary shape to the second end 92 for mating with threaded shaft 90. If desired, holes in the brackets 52 may receive pressed-in bushings to support cylindrical ends of the worm 110 and the worm gear 112. Washers may be used to reduce friction. Different sets of worm/worm gears can be used in the gearbox 50. In one example, the gearbox 50 can be configured to provide a gear reduction ratio of up to 21.

Figure 5A:
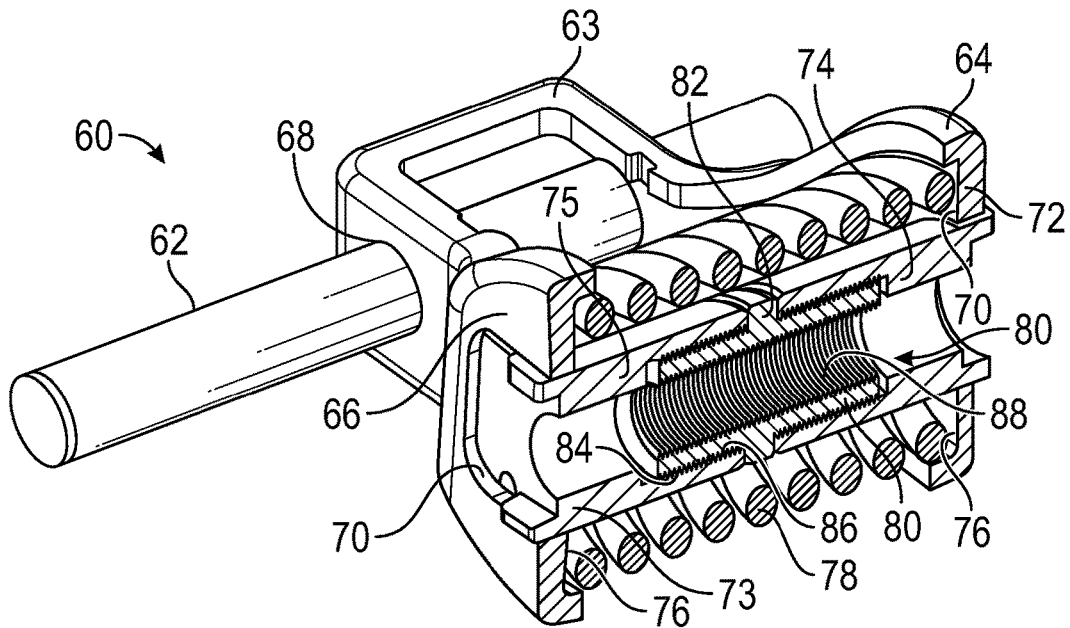
FIG. 5A is a cross-sectional view of a fork driving unit of the actuator module.
Figure 5B:
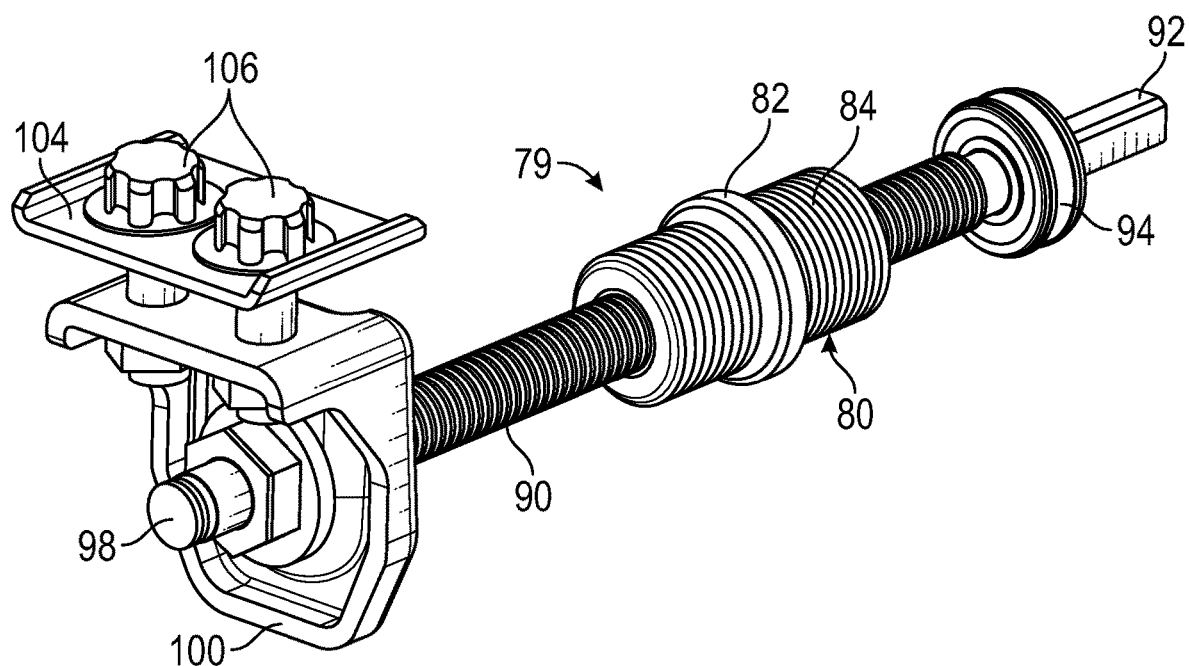
FIG. 5B is a perspective view of a drive assembly of the actuator module.

Referring to FIGS. 5A and 5B, shaped apertures 70, for example, a quadrangular shape, are provided in each of the first and second walls 64, 66. A pusher assembly includes first and second pushers 74, 75 respectively having first and second pusher ends 72, 73 received within respective apertures 70 of the first and second walls 64, 66. The first and second walls 64, 66 each include inner surfaces disposed about the aperture 70 to provide a seat 76. A spring 78 is arranged between the first and second walls 64, 66 and engage the seats 76 and flange seats of the pusher ends 72, 73. The spring 78 is configured to bias the pusher assembly and the fork driver 60 to a neutral position relative to one another. The pusher ends 72, 73 are received within the aperture 70 in a slip fit relationship to permit the pusher assembly to actually slide relative to the fork driver 60 between the neutral position and a transition position while preventing rotation of the pusher assembly relative to the fork driver 60. This configuration enables the smooth operation of the actuator module for example during a shifting sequence of the shifting member 13, avoiding jarring engagement of the shifting member 13 with its mating component.

The drive assembly 79 includes a driving nut 80 having a flange 82. A threaded outer diameter 84 of the driving nut 80 secures to complementarily-shaped threaded inner diameter 86 of the spring pusher 74. This enables the pusher assembly to be installed onto the driving nut 80 and about the spring 78 during assembly.

The driving nut 80 includes a threaded inner diameter 88 that cooperates with a leadscrew or threaded shaft 90 of the drive assembly 79. The threaded shaft 90 includes a first end 92 having a feature, such as a square end, that connects to the gearbox 50. A bearing 94 supports the first end 92 for rotation with respect to the first cover portion 22. The threaded shaft 90 includes a second end 96 supported by a bracket 100 using a lock nut 98 secured to the second end 96. The bracket 100 is mounted to the first cover portion 22 along with a reinforcing plate 104 that is secured to the first cover portion 22 by fasteners 106 extending through holes 108 (FIG. 1).

The PCB 42 communicates with a rotary sensor assembly 116 and a linear sensor assembly 130 that monitor the movement of various elements within the actuator module 18 to ensure that the driveline assembly 10 is shifted into its desired gear in response to a shifting command from the vehicle. In the example, rotor sensor assembly 116 is used to monitor the position and speed input to the fork driving unit 58, and the linear sensor assembly 130 is used to monitor the position and speed output from the fork driving unit 58.

Figure 6:
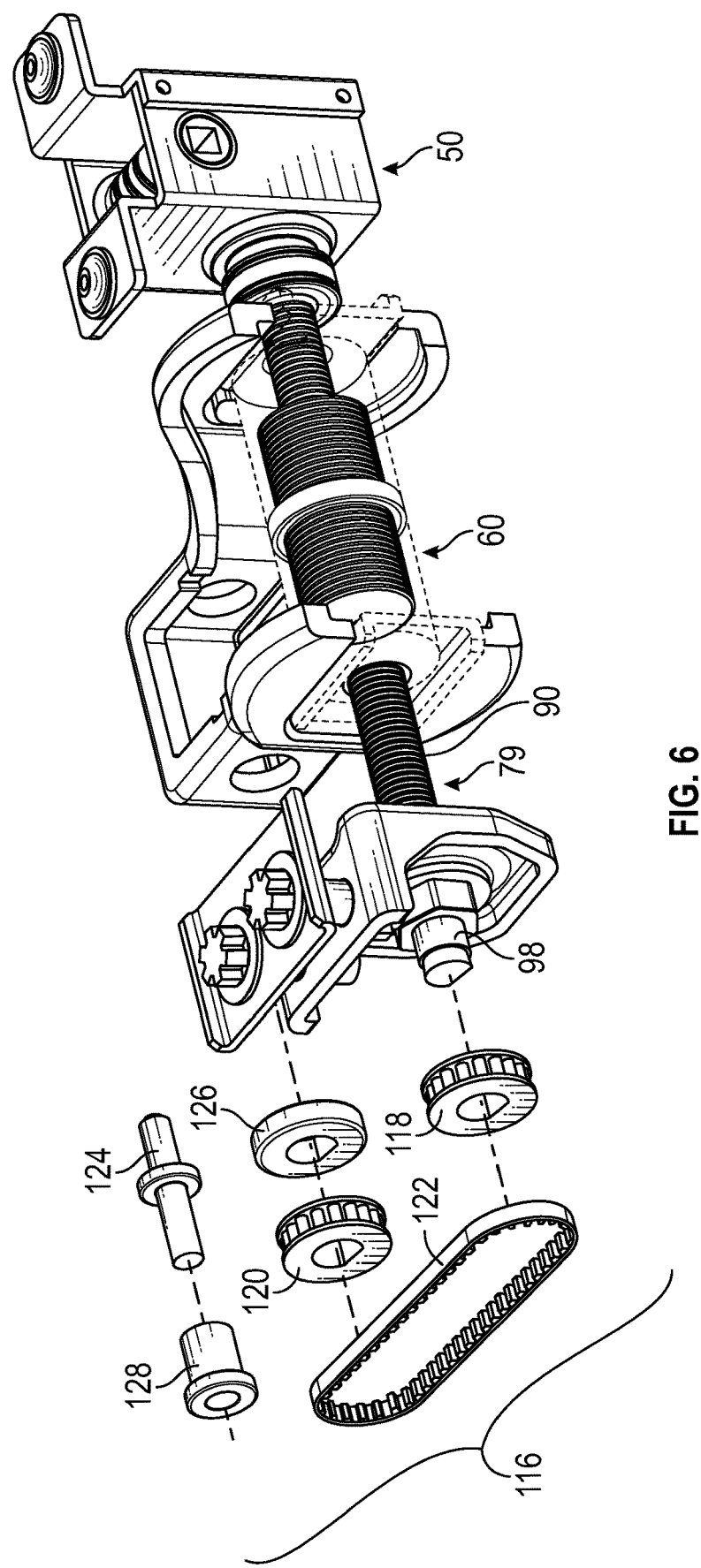
FIG. 6 is a perspective view of the gearbox, fork driving unit, and drive assembly with an exploded view of a rotary sensor assembly.

Referring to FIG. 6, the rotary sensor assembly 116 measures the rotational position of the drive assembly 79 to determine the position of the shift fork 14. The rotary sensor assembly 116 includes a drive pulley 118 mounted to the lock nut 98 at a keyed interface. A follow pulley 120 is driven by the drive pulley 118 via a belt 122 providing a 1:1 ratio. The follow pulley 120 is supported by the first side 28 of the first cover portion 22 with a pin 124 mounted to a boss. A rotary sensor 126 is mounted to the drive pulley 118, and a connector 128 is secured to the pin 124 to capture the drive pulley 118 and rotary sensor 126. In this manner, the drive assembly 79 has a drive axis, and the rotary sensor 126 has a sensor axis offset from the drive axis. This configuration enables the rotary sensor 126 to be located in position remote from the threaded shaft 90 for improved packaging.

Figure 7:
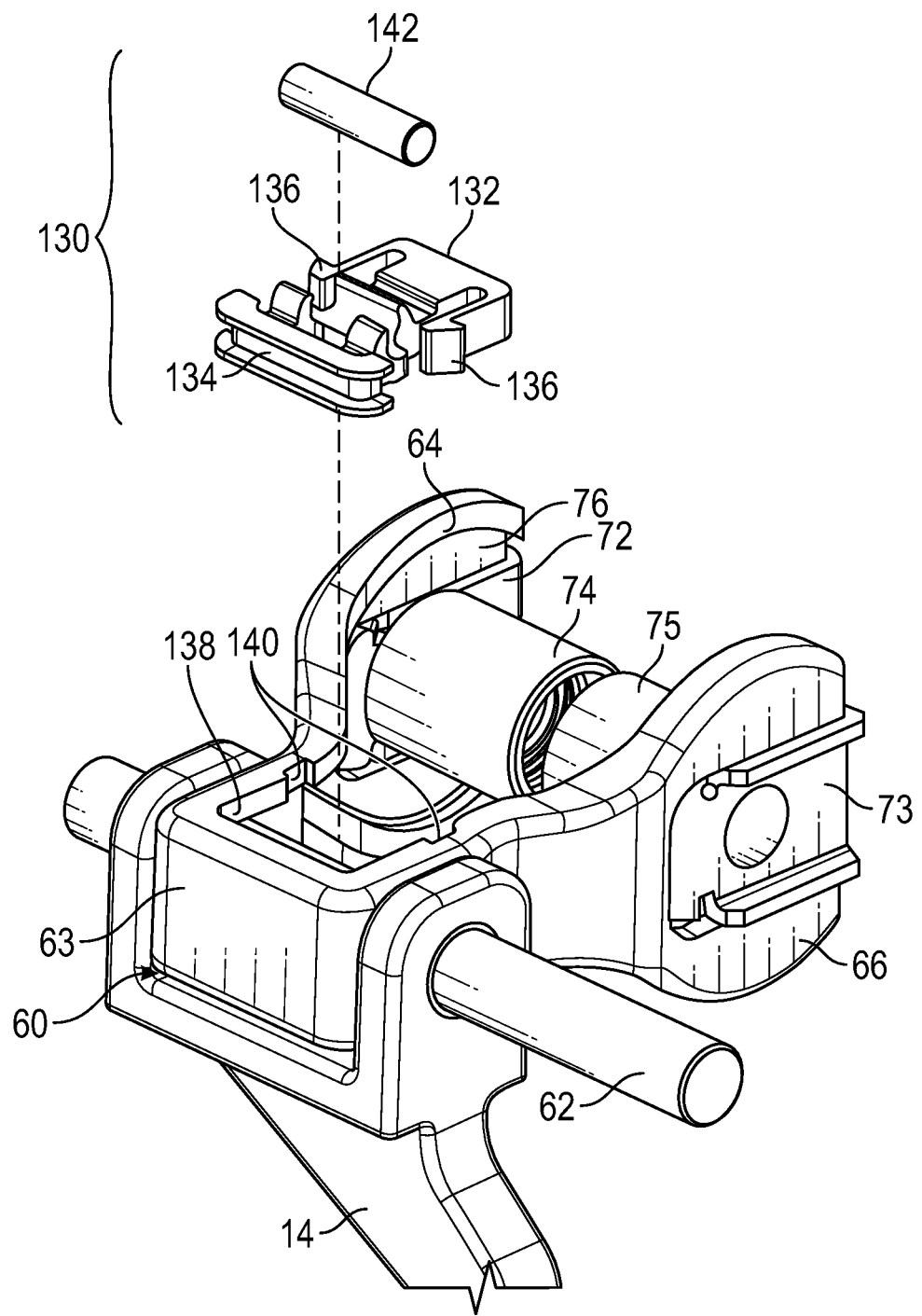
FIG. 7 is a perspective of a portion of the fork driving unit with an exploded view a linear sensor assembly.

Referring to FIG. 7, the linear sensor assembly 130 is supported by the fork driving unit 58 to measure the axial position of the shift fork 14. The linear sensor assembly 130 includes a sensor holder 132 that is mounted to the central portion 63 of the fork driver 60. The sensor holder 132 includes a channel 134 received in a lip 138 of the central portion 63, which takes advantage of the stamped sheet metal features of the fork drive 60. Snaps 136 provided by the sensor holder 132 cooperate with notches 140 in the central portion 63. A linear sensor 142 is mounted within the sensor holder 132.

Figure 8:
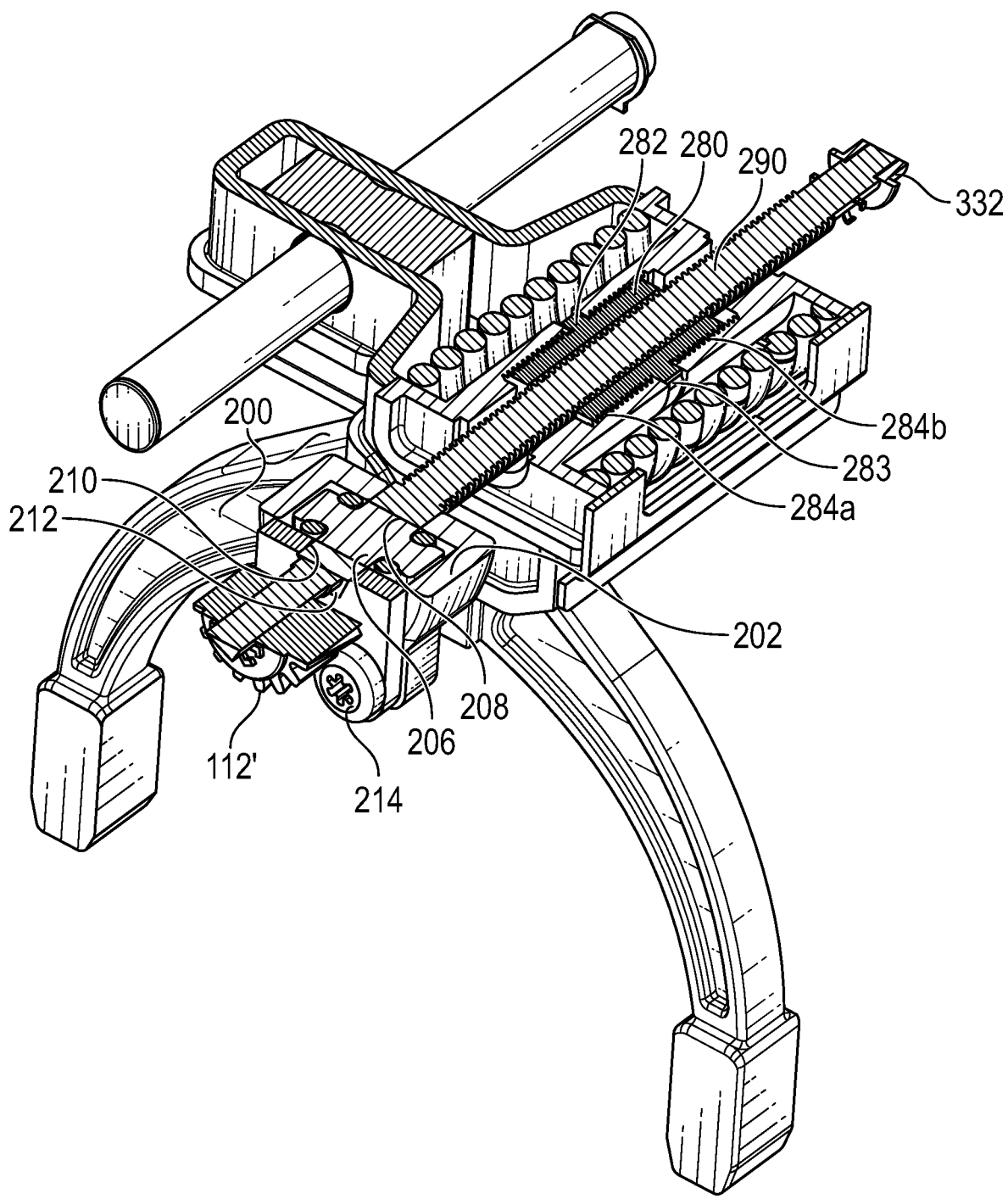
FIG. 8 is a cross-sectional view through another drive assembly and bearing arrangement.
Figure 9:
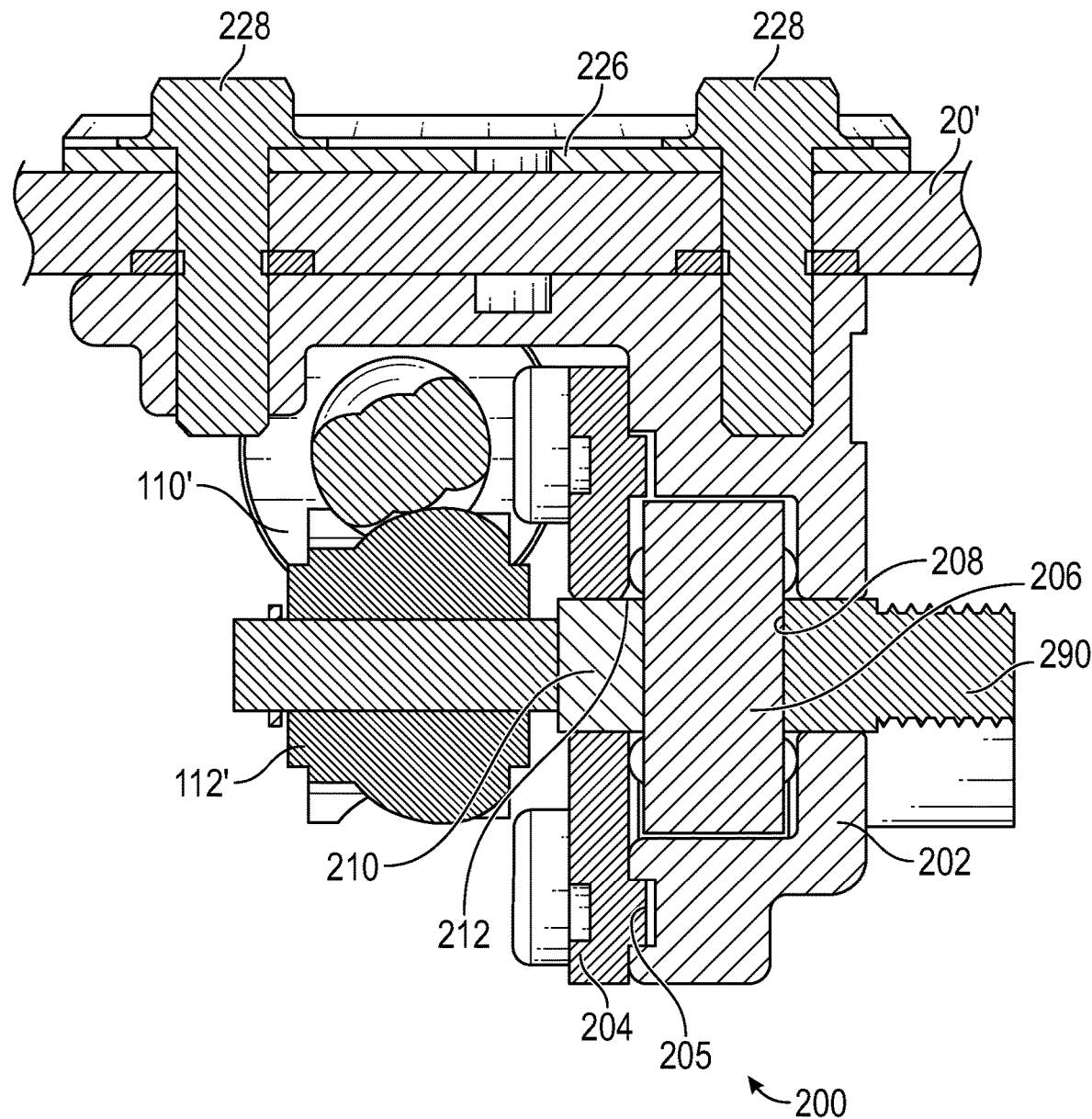
FIG. 9 is a cross-sectional view through the bearing arrangement shown in FIG. 8.

Referring to FIGS. 8 and 9, a separate bracket 200 may be used to house a bearing 206 supporting one end of the threaded shaft 290. The bracket 200 includes a first bracket portion 202, which may be cast, secured to the cover housing 20' using a plate 226 and fasteners 228. The second bracket portion 204, which may be stamped sheet metal, includes locating pins 205 received in corresponding recesses in the first bracket portion 202 to capture the bearing 206 within a pocket in the first bracket portion 202 using fasteners 214. The bearing 206 abuts a shoulder 208 on the threaded shaft 290 and is clamped thereto by a nut 210 freely disposed within an opening 212 in the second bracket portion 204.

Figure 13:
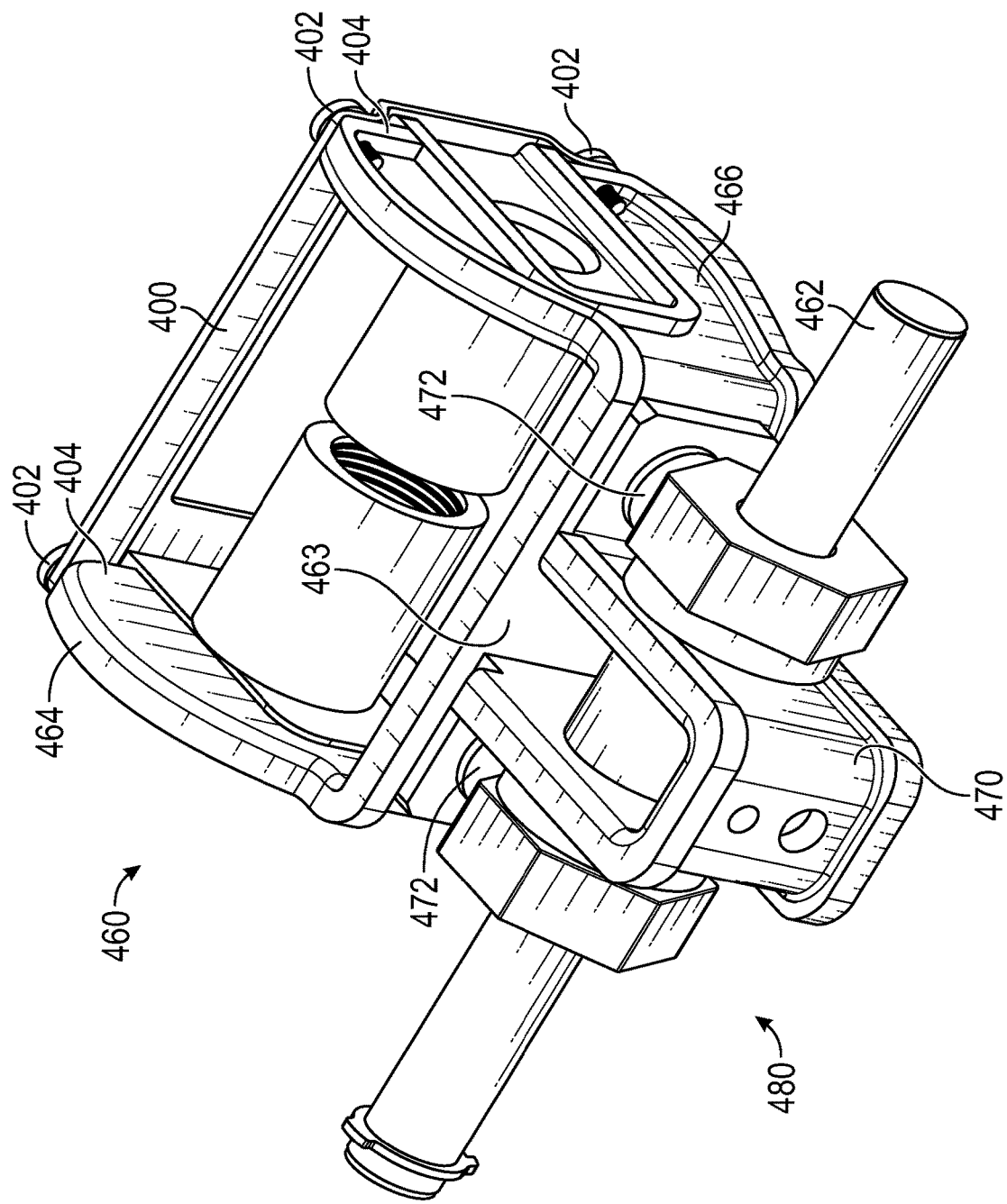
FIG. 13 is a perspective view of another drive assembly with a bearing arrangement for a fork shaft.

It is desirable for the lateral outer faces of the first and second spring pushers 274, 275 to be flush with the outer lateral faces of the fork support 470 (FIG. 13). To this end, the driving nut 280 includes opposing right-hand and left-hand threads that are threadingly secured to the first and second spring pushers 274, 275, so as to provide a turnbuckle. The annular flange 282 includes notches 283 about its periphery so that a tool can be used to adjust the distance between the spring pushers during assembly to ensure flange seats are flush with those of the fork support, which ensures there is no undesired clearances or take-up in the drive assembly. Any motion in the system without movement in the fork 14 may lead to poor performance.

Figure 10A:
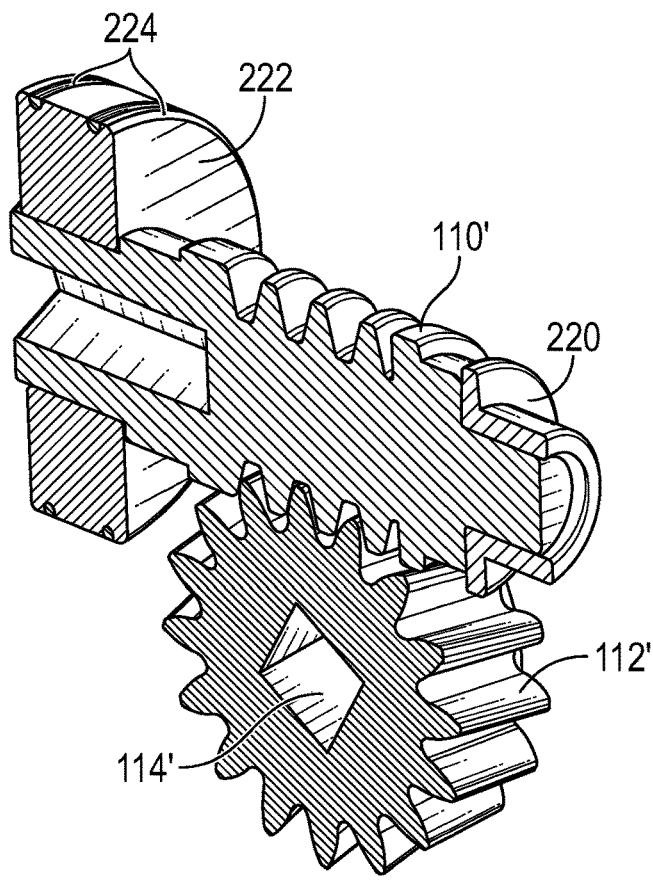
FIGS. 10A and 10B respectively are cross-sectional perspective views through a gearbox and a perspective view of a bearing support bracket carrying the gearbox.
Figure 10B:
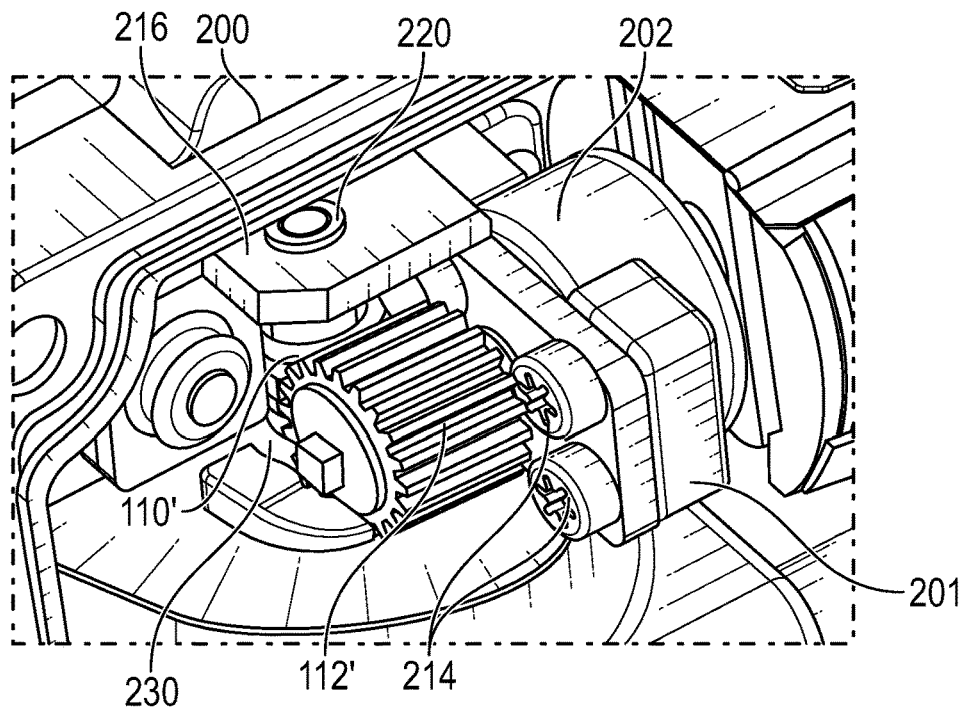

In this example configuration, rather than using a separate gearbox (e.g., FIG. 4), the bracket 200 is also used to support the gears. The worm gear 112' is keyed to the end of the threaded rod 290 as previously described. The second bracket portion 204 has a flange 216 with a hole 218 that supports an end of the worm 110' by a first bushing 220, as shown in FIGS. 10A and 10B. The opposite end of the worm 110' is supported by a second bushing 222 that is mounted to the cover housing 20'. Seals 224 in the second bushing 222 isolate the motor from the lubricant in the cavity 16.

Figure 11:
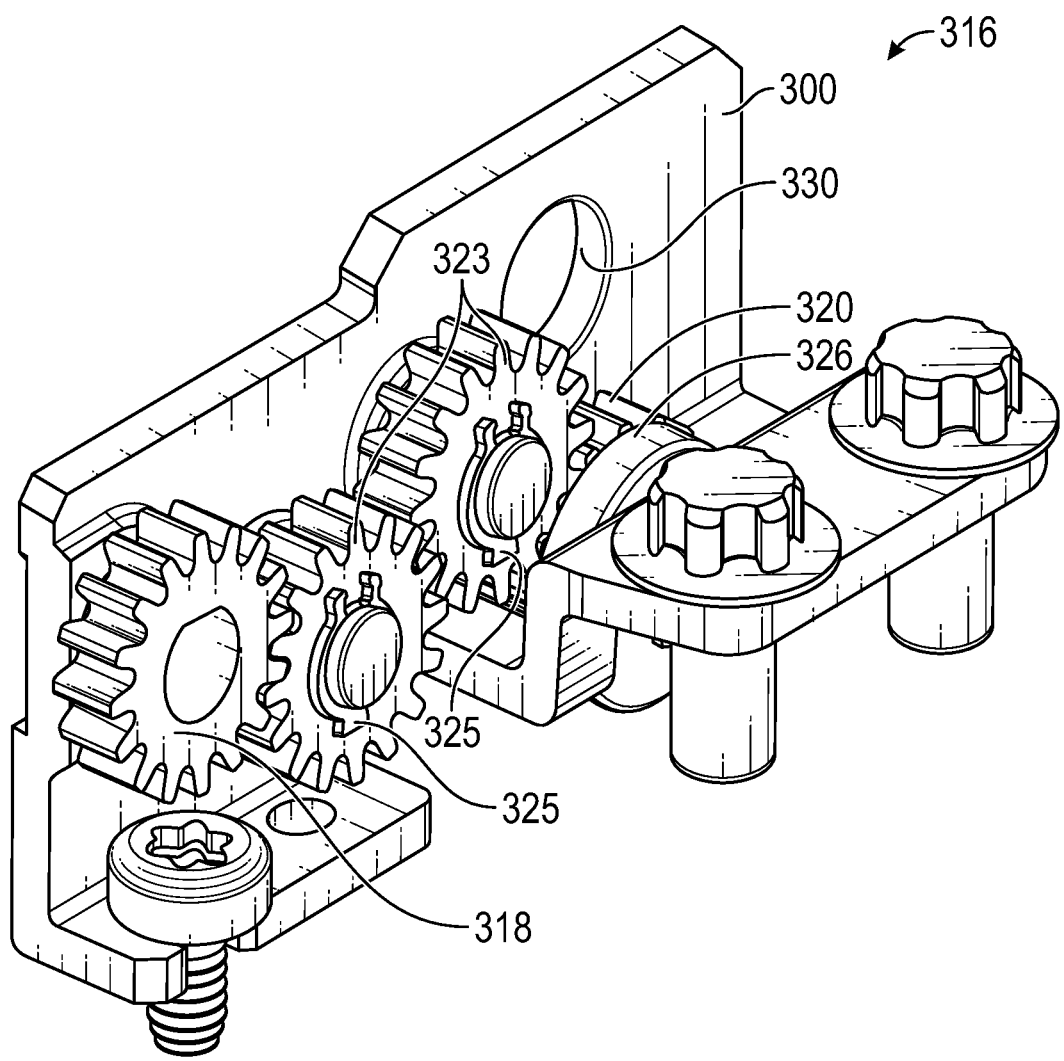
FIGS. 11 and 12 are perspective assembled and exploded views of another rotary sensor assembly.
Figure 12:
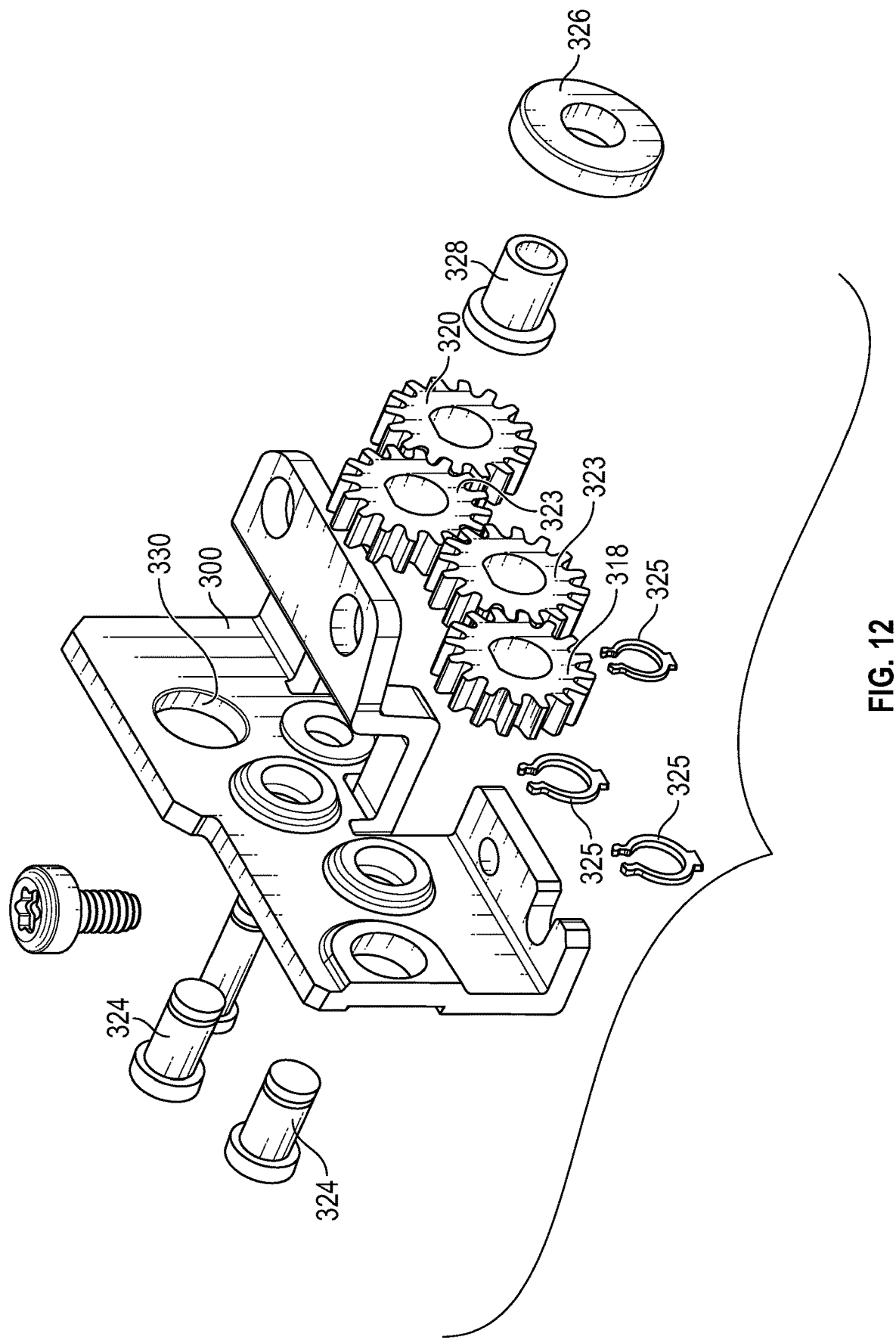

Referring to FIGS. 11 and 12, a bracket 300 has a hole 330 that supports an end of the fork shaft 462 (FIG. 13). This same bracket 300, mounted to the cover housing 20' (e.g., first cover portion 22) also supports the rotary sensor assembly 316, which by be a belt drive (FIG. 6) or a gear train. The driven gear 318 receives an end 332 of the threaded rod 290 (FIG. 8) to provide rotational input to the rotary sensor assembly 316. The rotation of the threaded rod 290 is communicated to the driven gear 320 via intermediate gears 323. The rotary sensor 326 rotates in unison with the driven gear 320 via connector 328. One or more of the gears 320, 323 are supported for rotation relative to the bracket 300 by pins 324 and circlips 325. Having the threaded rod 290 and the rotary sensor assembly 316 supported by a common bracket reduces tolerances in the system.

Figure 14:
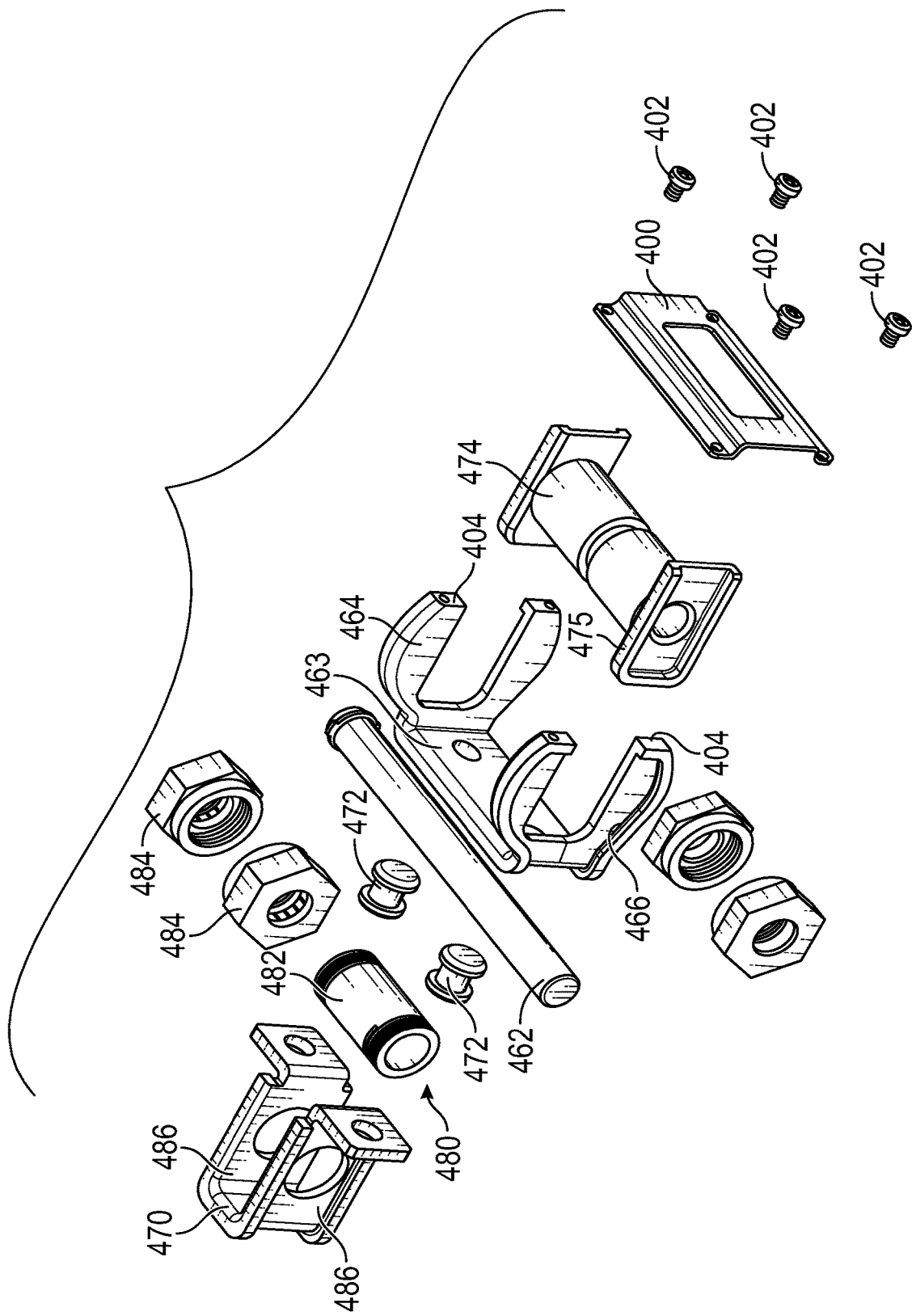
FIG. 14 is an exploded view of the drive assembly shown in FIG. 13.

Turning to FIGS. 13 and 14, another example fork driver 460 provides increased versatility. A reinforcement plate 400 is secured to end faces of the first and second walls 464, 466 using fasteners 402. The reinforcement plate 400 captures the spring pushers and prevents racking of the assembly. A fork support 470 is secured to the central portion 463 connecting the first and second walls 464, 466 with fasteners 472, such as rivets or welds, for example. In this way, different fork supports may be selected and secured to a common spring pusher support depending upon the application.

Figure 15A:
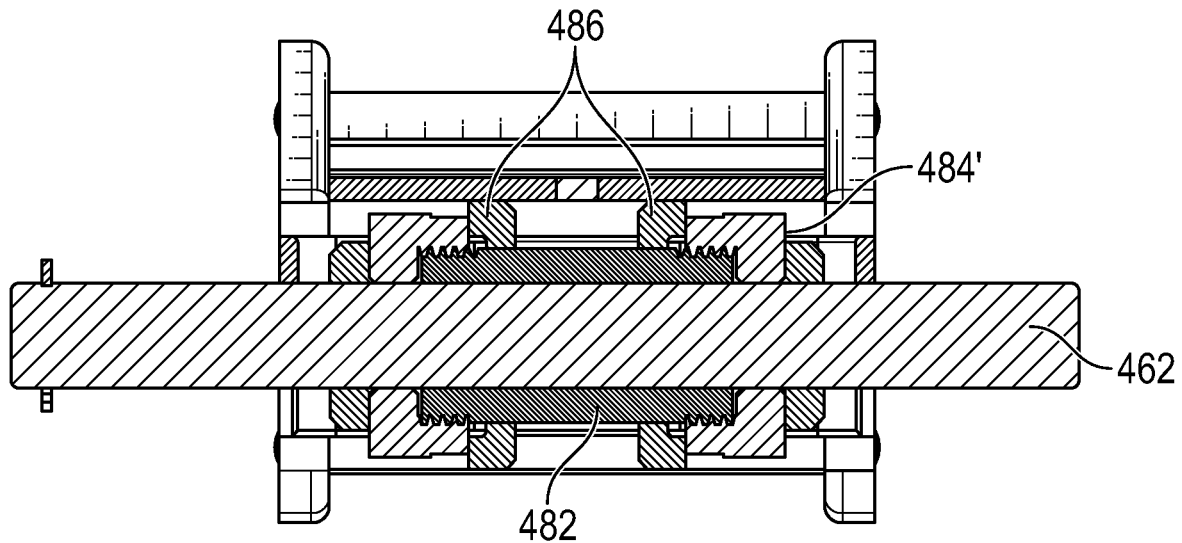
FIGS. 15A and 15B depict cross-sections of first and second bearing arrangements for the fork shaft.
Figure 15B:
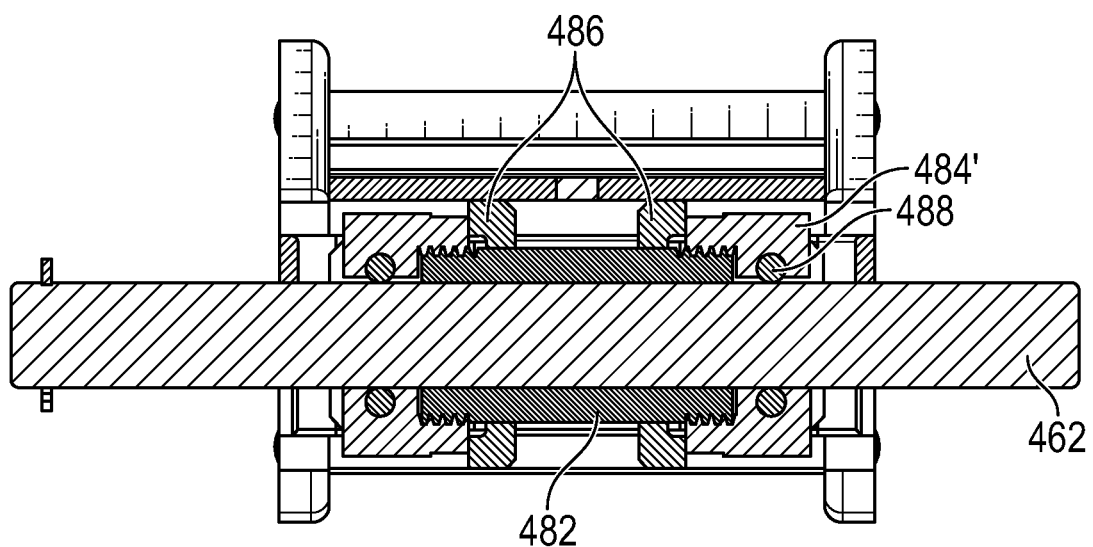

A bearing assembly 480 supports the fork driver 460 for sliding motion along the fork shaft 462 in applications having increased loads. A spacer 482 extends through the fork (14 in the figures). Bearing end caps 484 are threaded onto the spacer 482 and clamp about lateral walls 486 of the fork support 470. In the example, shown in FIG. 15A, the bearing end caps 484' are bushings, whereas the example bearing end caps 484 illustrated in FIG. 15B include rolling elements 488 for increased load capability. The example bearing assembly 480 spreads the fork load over a relatively large distance on the fork shaft 462, which provides increased stability under high loads.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An actuator module for a driveline assembly comprising:
    a cover housing;
    a fork driving unit supported by the cover housing, the fork driving unit including:
        a fork driver axially slidably supported by an unthreaded portion of a fork shaft between multiple shift positions;
        a pusher assembly coupled to the fork driver by spaced apart pusher ends;
        a drive assembly arranged parallel to the fork shaft, the drive assembly carried by the pusher assembly to translate the fork driver relative to the cover housing, the drive assembly includes a threaded shaft and a drive nut with a threaded inner diameter that threadingly engages the threaded shaft, the threaded shaft parallel to the fork shaft, the pusher assembly includes first and second pushers joined by the drive nut; and
        a spring being axially slidably carried by the threaded shaft, biasing the pusher assembly and fork driver to a neutral position.

2. The actuator module of claim 1, wherein the fork driver includes first and second walls extending from a central portion, the first and second walls have shaped apertures, and the pusher ends are received in the shaped apertures to permit the pusher assembly to axially slide relative to the fork driver between the neutral position and a transition position while preventing rotation of the pusher assembly relative to the fork driver.

3. An actuator module for a driveline assembly comprising:
    a cover housing;
    a fork driving unit supported by the cover housing, the fork driving unit including:
        a fork driver axially slidably supported by a fork shaft between multiple shift positions;
        a pusher assembly coupled to the fork driver by spaced apart pusher ends;
        a drive assembly arranged parallel to the fork shaft, the drive assembly carried by the pusher assembly to translate the fork driver relative to the cover housing, the drive assembly includes a threaded shaft and a drive nut with a threaded inner diameter that threadingly engages the threaded shaft, the pusher assembly includes first and second pushers joined by the drive nut; and
    a spring biasing the pusher assembly and fork driver to a neutral position;
    wherein the fork driver includes first and second walls extending from a central portion, the first and second walls have shaped apertures, and the pusher ends are received in the shaped apertures to permit the pusher assembly to axially slide relative to the fork driver between the neutral position and a transition position while preventing rotation of the pusher assembly relative to the fork driver; and
    wherein the drive nut has both left-hand threads and right-hand threads, each of the first and second pushers includes a flange seat received in a respective shape aperture, and one end of the spring engages the first wall and the flange seat of first pusher, and another end of the spring engages the second wall and the flange seat of the second pusher.

4. The actuator module of claim 3, comprising:
    a motor supported relative to the cover housing; and
    a gearbox coupling a motor and the drive assembly, the gearbox supported relative to the cover housing, wherein the gearbox is provided by a worm and a worm gear mounted to a worm gear bracket secured directly to the cover housing.

5. The actuator module of claim 4, wherein the bracket is provided by first and second gear housing brackets having an L-shape, each of the first and second gear housing brackets include a mounting flange secured to the cover housing.

6. The actuator module of claim 5, wherein the first and second gear housing brackets include holes configured to receive bushings that support cylindrical ends of the worm and the worm gear.

7. The actuator module of claim 4, wherein the threaded shaft has first and second ends, the first end is coupled to the worm gear, and the second end is supported by another bracket secured to the cover housing.

8. The actuator module of claim 3, comprising:
    a printed circuit board;
    a motor supported relative to the cover housing;
    wherein the drive assembly has a drive axis;
    a rotary sensor is in communication with the printed circuit board and arranged in relation to the fork driving unit to measure a position of the fork driver, the rotary sensor has a sensor axis offset from the drive axis, the rotary sensor operatively coupled to the drive assembly and configured to measure the position of the drive assembly; and
    a linear sensor assembly mounted to the fork driver and configured to measure the position of the fork driver.

9. The actuator module of claim 8, comprising a gearbox coupling the motor and the drive assembly the gearbox is supported relative to the cover housing.

10. The actuator module of claim 8, wherein the rotary sensor assembly includes a drive pulley attached to threaded shaft, an anchor pin is mounted to the cover housing to support a follow pulley to which the rotary sensor is mounted, and a belt interconnects the drive and follow pulleys.

11. The actuator module of claim 1, wherein the cover housing assembly includes first and second cover portions enclosing the drive assembly.

12. The actuator module of claim 11, comprising a motor, and a gearbox coupling the motor and the drive assembly, the motor and the gearbox arranged between the first and second cover portions.

13. The actuator module of claim 12, wherein the threaded shaft has first and second ends, the first end is coupled to the gearbox, and the second end is supported by a bracket secured to the cover housing.

14. The actuator module of claim 3, wherein the drive assembly has a drive axis, and comprising a rotary sensor assembly having a rotary sensor with a sensor axis offset from the drive axis, the rotary sensor operatively coupled to the drive assembly and configured to measure a position of the fork driver.

15. The actuator module of claim 3, comprising a linear sensor assembly mounted to the fork driver and configured to measure a position of the fork driver.

16. The actuator module of claim 3, comprising a gearbox coupling a motor and the drive assembly, the gearbox has a worm and a worm gear mounted to first and second gear housing brackets having an L-shape, each of the first and second gear housing brackets include a mounting flange secured to the cover housing.

17. The actuator module of claim 16, wherein the motor is connected to the worm, and the drive assembly is connected to the worm gear.

* * * * *